United States Patent
Courbon

(10) Patent No.: US 7,261,272 B2
(45) Date of Patent: Aug. 28, 2007

(54) CONICAL SUPPORT ARM JOINT FOR A VEHICLE MIRROR

(75) Inventor: Emmanuel Courbon, Columbia, SC (US)

(73) Assignee: Lang Mekra North America, LLC, Ridgeway, SC (US)

( * ) Notice: Subject to any disclaimer, the term of this patent is extended or adjusted under 35 U.S.C. 154(b) by 195 days.

(21) Appl. No.: 11/131,965

(22) Filed: May 18, 2005

(65) Prior Publication Data

US 2006/0261239 A1    Nov. 23, 2006

(51) Int. Cl.
    *A47G 1/16* (2006.01)
(52) U.S. Cl. ............... 248/475.1; 248/289.11; 248/477; 248/478; 248/900; 359/871
(58) Field of Classification Search ........... 248/475.1, 248/476, 477, 478, 479, 549, 900, 289.11; 359/871, 872
    See application file for complete search history.

(56) References Cited

U.S. PATENT DOCUMENTS

| | | | |
|---|---|---|---|
| 1,083,471 A | 1/1914 | Walton et al. | |
| 1,536,985 A | 5/1925 | Swinford | |
| 2,885,230 A | 5/1959 | Terpin | |
| 3,085,821 A | 4/1963 | Ryck | |
| 3,614,140 A | 10/1971 | Nestor | |
| 3,735,849 A | 5/1973 | Lutz | |
| 3,784,149 A | 1/1974 | Brudy | |
| 3,811,715 A | 5/1974 | Brudy | |
| 4,144,614 A | 3/1979 | Barbee | |
| 4,186,905 A | 2/1980 | Brudy | |
| 4,555,199 A | 11/1985 | Maier et al. | |
| 4,600,334 A | 7/1986 | Soussloff | |
| 6,550,097 B1 | 4/2003 | Zimmer | |
| 6,558,066 B1 | 5/2003 | Zimmer | |
| 6,641,271 B1 * | 11/2003 | Churchett | 359/841 |
| 2002/0001148 A1 | 1/2002 | Fuchs et al. | |

FOREIGN PATENT DOCUMENTS

| | | |
|---|---|---|
| GB | 175709 | 2/1922 |
| GB | 854884 | 11/1960 |
| GB | 2374578 | 10/2002 |

* cited by examiner

Primary Examiner—Ramon O Ramirez
(74) Attorney, Agent, or Firm—McNair Law Firm, P.A.

(57) ABSTRACT

A conical rotary joint is provided for a vehicle mirror assembly and the like having a fixed mount and a moveable support arm. A base is carried by one of the fixed mount and moveable arm, and a conical receptacle is carried by the base. A conical plug body is received in the conical receptacle. The conical plug is carried by the other of the fixed mount and support arm. The conical receptacle has a conical bearing surface which mates with the conical bearing surface of the conical plug. A biasing element presses the conical bearing surfaces together in a tight fit to reduce play and wear. First and second indents correspond to operating and folded positions of the support arm, and biased operator has a first deflected position in which the operator engages with a selected indent to retain the support arm in position.

22 Claims, 3 Drawing Sheets

CONICAL SUPPORT ARM JOINT FOR A VEHICLE MIRROR

The present invention relates to a vehicle mirror assembly, and more particularly to an improved rotary joint which allows rotation between a mirror support arm of the assembly and the vehicle with reduced wear.

BACKGROUND OF THE INVENTION

Different arrangements are known for mounting external mirrors on vehicles. On large, commercial vehicles, such as trucks and buses, mirrors are often secured within mirror housing on support arms which locate the mirror away from the vehicle to provide a clear view of different areas around the vehicle. Depending on the size and design of the mirror, as well as the area around the vehicle, different mounting arrangements have been used. For example, U.S. Pat. No. 6,302,549 discloses a bi-axially adjustable mirror mounting assembly. U.S. Pat. No. 6,793,357 discloses another vehicle mirror having a mirror housing which is supported in a manner that the housing may be bi-axially adjusted relative to a mirror support arm without undesired rotation. Typically, spherical couplings are used in these joints which are subject to wear. If too much wear occurs, vibration and shaking of the mirror pane can occur with possible loss or blur of some vision.

SUMMARY OF THE INVENTION

An improved rotary joint is provided by the present invention for a vehicle mirror assembly of the type having at least one mirror head carried by a support arm, and a vehicle mount for attachment to the vehicle. The support arm is pivotally attached to the vehicle mount having an operating position and a folded position. A rotary joint is connected between the vehicle mount and the support arm for pivoting the support arm between the operating and folded positions. Advantageously, a conical receptacle is included in the rotary joint, and a conical plug is fitted within the conical receptacle. A connector interconnects the conical plug and conical receptacle together in mating relationship to the vehicle mount. A biasing element urges the respective conical bearing surfaces of the conical receptacle and plug together in a tight fitting relationship so that play and subsequent wear between the conical bearing surfaces are significantly reduced to provide a more reliable rotary joint. The conical bearing surfaces thus wear less and mirror vibration and shaking are reduced.

In an advantageous aspect of the invention, a biased operator is carried by the support arm and is biased against a socket base in which the conical receptacle is formed. The operator has a natural position, a first deflected position, and a second deflected position. The socket base has at least a first detent for maintaining the support arm in the operating position, and may also have a second detent for maintaining the support arm in the folded position, as well as additional detents for additional positions. The operator is engaged with the first detent when the support arm is in the operating position and is engaged with the second detent when the support arm is in a folded position. The biased operator deflects to the first deflector position when engaged with either the first or second detent. The operator is deflected to the second deflector position when the operator arm is being moved between the first and second detent of the socket body. In another beneficial aspect, the operator comprises an elongated leaf spring with one or more cams formed intermediate the first and second ends. Mounting elements carried by the support arm fix the elongated spring in the support arm in a manner that the cam and spring deflect from the natural unstressed state of the spring.

The connector preferably includes a fastener extending through the conical plug body and socket receptacle pressing their surfaces together while attaching to the support arm at one end and to the vehicle mount at a second end. Advantageously, the biasing element comprises a spring element carried about the fastener shaft at one of the first and second ends. The spring element may comprise a spring washer carried about the pivot shaft such as a Belleville washer.

In another aspect of the invention, an improved and simplified rotary joint for a mirror assembly having a vehicle mount and a pivotal support arm is provided including a first rotary part carried by said vehicle mount, and a second rotary part carried by said support arm. A connector interconnects the first and second rotary parts together in mating relationship so that the support arm pivots to the operating and folded positions. First and second detents are carried by one of the vehicle mount and the support arm corresponding to said operating and folded positions, respectively, of the support arm. An elongated spring element is disposed between the vehicle mount and said support arm having a natural position, a first deflected position, and a second deflected position. The spring element includes a cam formed near a medial portion of the spring element which engages a selected detent. The spring element deflects to the first deflected position when the cam is engaged with selected detent. The spring element is deflected to the second deflected position when the support arm is being moved between the first and second detents.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
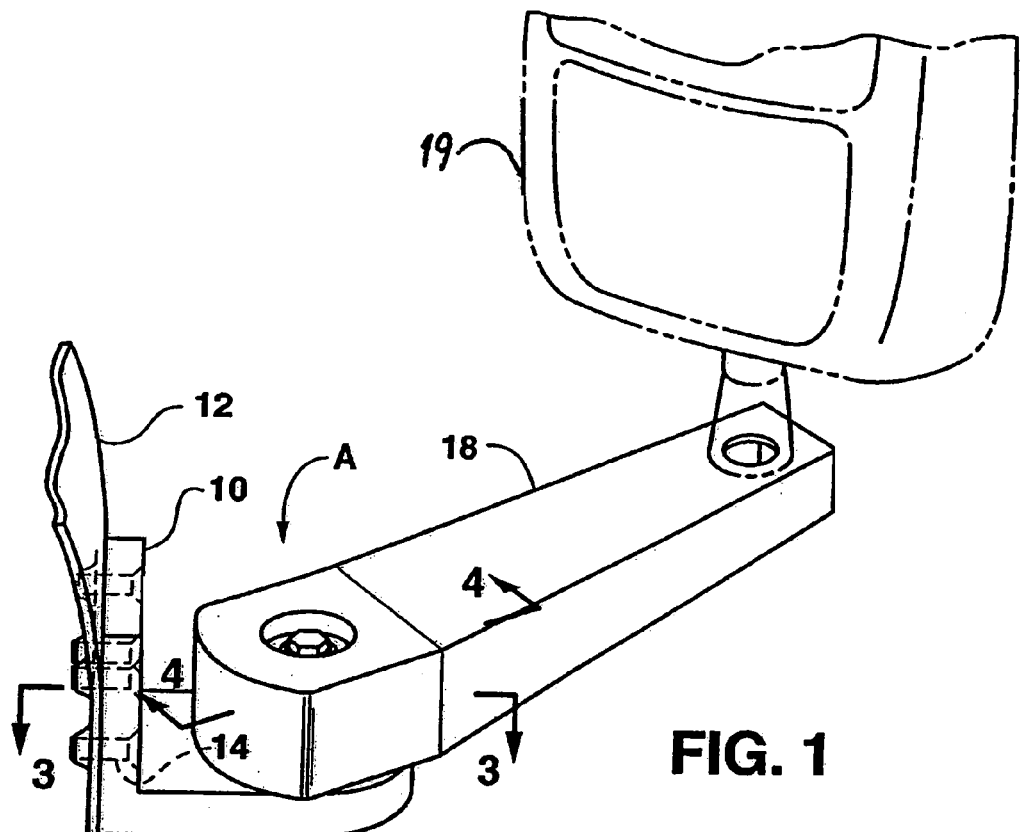
FIG. 1 is a perspective view illustrating a conical joint for a mirror support arm constructed according to the invention.
Figure 2:
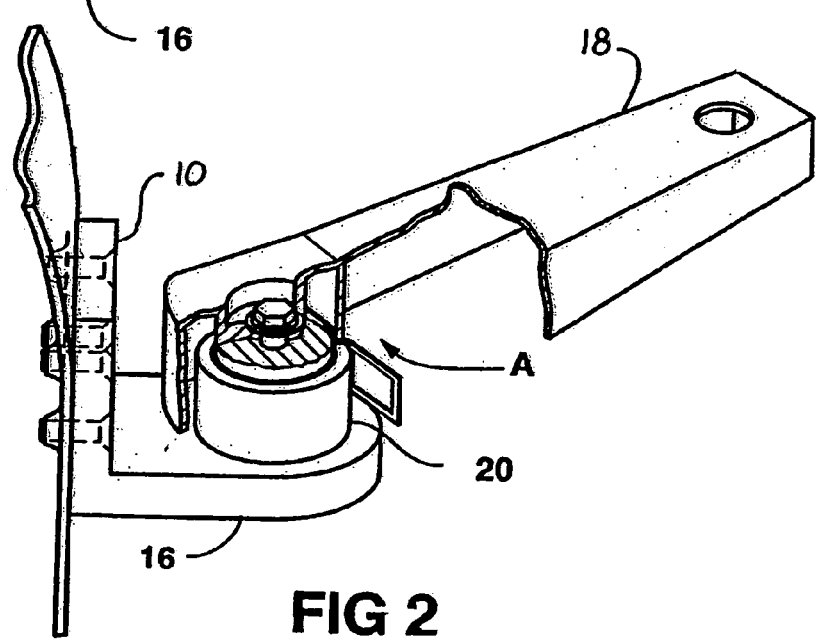
FIG. 2 is a perspective view of FIG. 1 with part of the conical joint housing cut away.

Referring to the drawings, the invention will now be described in more detail.

As can best be seen in FIG. 1, a vehicle mount 10 is attached to a vehicle 12 by means of conventional fasteners, such as bolts 14. Vehicle mount 10 includes a base 16 on which a mirror support arm 18 is pivotally carried. Support arm 18 is attached to vehicle mount base 16 by means of a rotary joint in the advantageous form of a conical detent joint designated generally as A. Conical joint A allows the support arm to pivot between a folded position where a mirror head 19 is folded toward the vehicle, and an operating position where the mirror head is extended away from the vehicle and may be further adjusted for viewing by the driver, as is explained below. Vehicle mount base 16 includes a first part in the form of a socket base 20 having a conical receptacle 22 with a cone surface 22a formed therein. Socket base 20 may be affixed to mount base 16 by any suitable means, such as a one piece construction, welding, or other suitable means of integrating socket base 20 and mount base 16.

Figure 4:
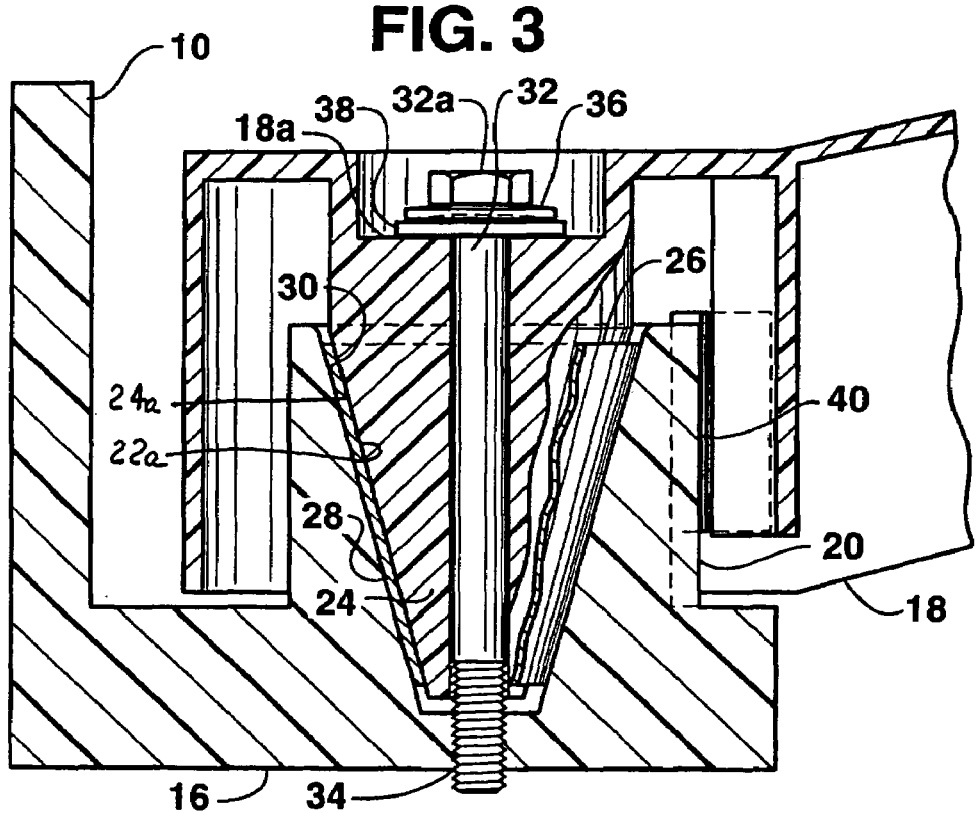
FIG. 4 is a sectional view taken along line 4—4 of FIG. 1.
Figure 5:
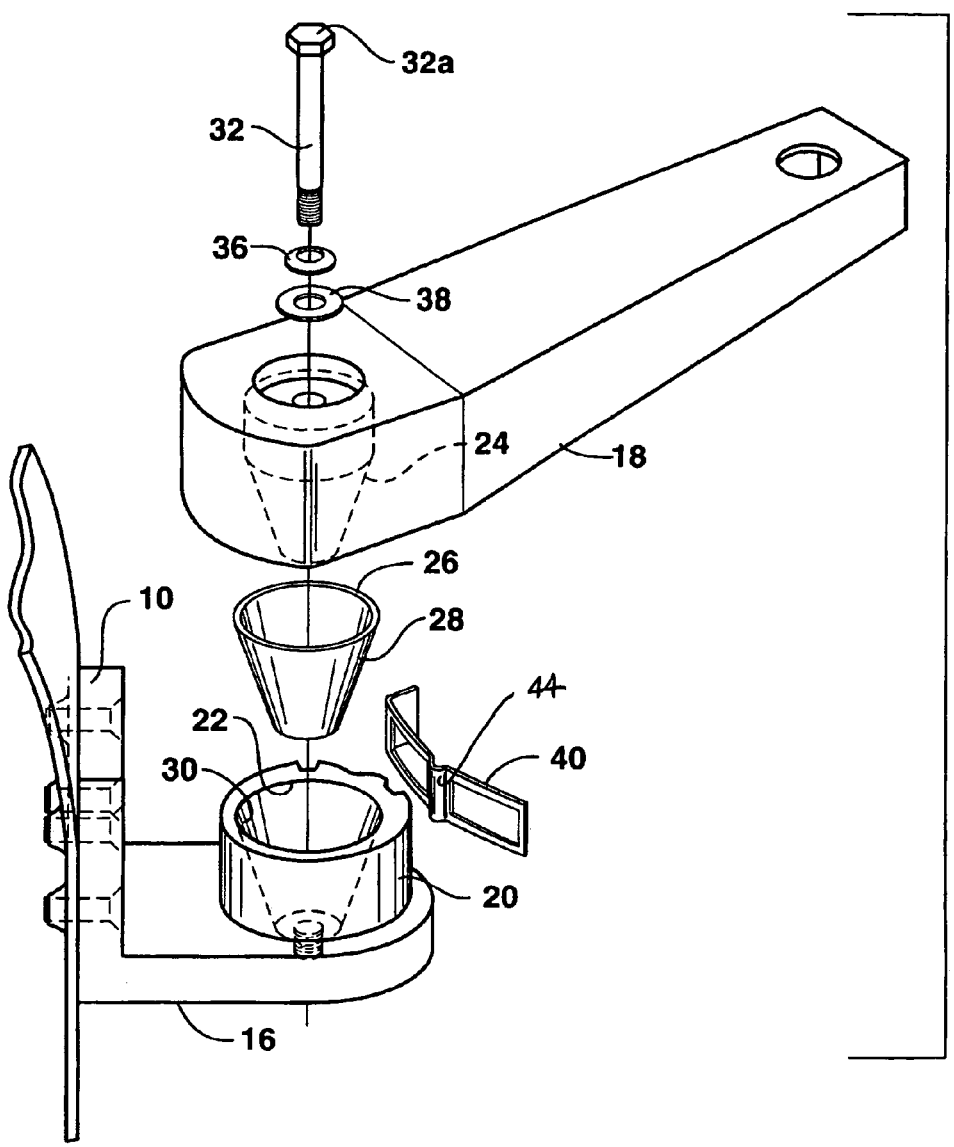
FIG. 5 is a perspective view with parts separated of a conical joint for a vehicle mirror support arm assembly according to the invention.

As can best be seen in FIGS. 4 and 5, vehicle support arm 18 includes a second rotary part in the form of a conical plug 24 made integral with the support arm 18 in any suitable manner. Conical plug 24 is received in conical receptacle 22 to provide a conical rotary joint of reduced wear. The conical plug includes a conical bearing surface 24a which accurately fits with conical bearing surface 22a of receptacle 22. In the case where the rotary connector parts are made from metal, a conical bushing 26 may be fitted between the receptacle and plug. Bushing 26 may be any suitable bushing, such as a delrin bushing. In the case where the conical connector parts are formed from a wear resistant polymer, the bushing may not be needed. Thus, the conical bearing surface 22a for the receptacle may either be the busing surface or the actual conical receptacle surface. Conical plug 24, conical bushing 26, and conical receptacle 22 are accurately made to integrally fit together to form a conical rotary joint. For this purpose, a connector bolt 32 extends through the support arm, conical receptacle 22, conical plug 24, and is threaded into a portion 34 of mount base 16. Advantageously, a spring 36 provides a biasing element and is fitted between a bolt head 32a and a flat surface 18a of support arm 18 by means of an intermediate washer 38. The spring may be a Belleville washer and extends a biasing force urging conical bearing surface 24a of conical plug 24 and conical bearing surface 22a of either the bushing or receptacle in a tight fit with little or no play or wear. Because of the conical distribution of forces over the mating conical bearing surfaces, play between the parts is prevented and a very low wear of the rotary connector parts is produced. When the bearing surfaces do wear, there will be no increased play between the surfaces because there will always be a normal component of force pressing the surfaces tightly together. Thus, wear is not a problem in the pivot joint provided by the present invention In this manner, mirror head vibration and shaking are reduced for better viewing.

Figure 3:
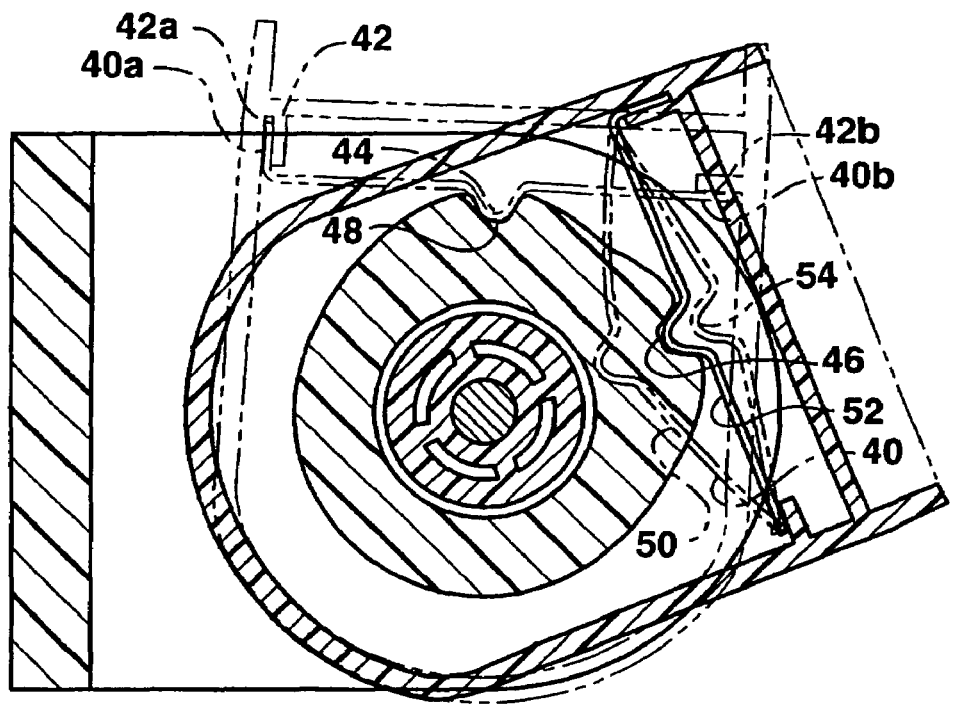
FIG. 3 is a top plan view taken along line 3—3 of FIG. 1.

In another advantageous aspect of the invention a simple, reliable operator mechanism is disclosed for maintaining the support arm and mirror head in a rotary position, including a biased operator 40 and one or more detents 46, 48, etc. The biased operator is advantageously provided in the form of an elongated leaf spring 40 to retain the support arm in a folded or operating position. Leaf spring 40 is carried by a spring holder 42 formed at the connector end of support arm 18. As can best be seen in FIG. 3, the spring holder includes a first mounting element 42a and a second element 42b which holds the remote ends of the leaf spring. For this purpose, leaf spring 40 includes a first bent end 40a and a second straight end 40b held by the mounting bars. In the illustrated embodiment, leaf spring 40 includes a single cam 44 which may be received in one of two detents 46 and 48 formed in socket base 20. At rest, leaf spring 40 normally has an inwardly extended, natural position 50. However, when cam 44 of the spring is received in one of the socket body detents, the spring assumes a first deflected position 52. Further, when the leaf spring is moved out of the detent and rests against the outer surface of socket base 20, it assumes a further compressed, second deflected position 54. Support arm 18 is locked in an operating position when cam 44 is received in first detent 46. In this position, mirror head 19 is extended from the vehicle for further adjustment on the support arm and viewing. If the support arm is sufficiently rotated manually by the driver of the vehicle, or is accidentally struck, the mirror moves to a folded position. This occurs by exerting a sufficient force on the support arm to move cam 44 out of detent 46 and into detent 48.

While one detent and one cam are illustrated in the explementary embodiment of the invention for each position, multiple detents and cams (teeth) can be used for each position for enhanced locking and reliability and, of course, one or more positions may be used in accordance with the invention.

Thus, it can be seen that a simple, improved, and advantageous construction for a rotary connector joint for a vehicle mirror assembly arm can be had according to the invention. A simple leaf spring construction can provide movement between an operating and/or multiple positions, while a simple conical plug and receptacle construction can provide reduced overall wear on the joint due to distribution of forces over mating-conical surfaces maintaining a tight fit even with surface wear. Due to the maintenance of a tight fit of conical bearing surfaces, the play that often occurs in spherical couplings is prevented or reduced along with mirror shaking.

While a preferred embodiment of the invention has been described using specific terms, such description is for illustrative purposes only, and it is to be understood that changes and variations may be made without departing from the spirit or scope of the following claims.

What is claimed is:

1. A vehicle mirror assembly having at least one mirror head which is positioned at a distance from the vehicle during normal operation comprising:

a vehicle mount for attachment to the vehicle;

a support arm pivotally attached to said vehicle mount and moveable between an operating position and a displaced position;

a rotary joint located between said vehicle mount and said support arm about which said support arm pivots between said operating and displaced positions;

said rotary joint including a socket base carried by said vehicle mount, said socket base including a conical receptacle formed therein with a cone bearing surface and an outer surface;

said support arm including a conical plug having a cone bearing surface fitted within said conical receptacle and a releasable operator mechanism operatively engaged with said outer surface for maintaining said support arm in one of said operating and displaced positions;

a connector interconnecting said conical plug and said conical receptacle together in mating relationship, and a biasing element urging said cone bearing surfaces together in a tight bearing relationship; whereby wear and subsequent play between said conical receptacle and said conical plug is minimized as said mirror assembly is moved between said operating and displaced positions providing a more reliable and long-lasting rotary joint.

2. The assembly of claim 1 wherein said outer surface of said socket base includes first and second detents and said operator mechanism includes a biased operator cam, said cam engaging said first detent when said support arm is in said operating position, engaging said outer surface when said support arm is between said positions and engaging said second detent when said operator mechanism is in said displaced position.

3. The assembly of claim 2 wherein said biased operator has a natural position, a first deflected position, and a second deflected position.

4. The assembly of claim 3 wherein said biased operator deflects to said first deflector position when engaged with either said first or second detent.

5. The assembly of claim 4 wherein said operator is deflected to said second deflector position when said support arm is being moved between said first and second detent of said socket body.

6. The assembly of claim 1 wherein said connector includes a fastener extending through said conical plug and receptacle being attached to said support arm at one end and to said vehicle mount at a second end.

7. The assembly of claim 6 wherein said biasing element comprises a spring element carried about said fastener near one of said first and second ends of said pivot shaft pressing said cone body and receptacle together in a tight fit.

8. The assembly of claim 7 wherein said spring element comprises a spring washer carried about said pivot shaft.

9. The apparatus of claim 1 wherein said operator mechanism biasing element comprises an elongated leaf spring having a first end and a second end with a cam being formed intermediate said first and second ends, first and second detents carried by said outer surface of said vehicle mount and said cam engaging said first detent to maintain said support arm in said operating position and said second detent to maintain said support arm in said displaced position.

10. The assembly of claim 9 including mounting elements carried by the support arm for fixing said first and second ends of said elongated spring in said support arm with said cam facing said outer surface.

11. A conical rotary joint for a vehicle mirror assembly and the like having a fixed mount and a moveable support arm;
    a base carried by one of said fixed mount and moveable arm;
    a conical receptacle carried by said base;
    a conical plug received in said conical receptacle, said conical plug carried by the other of said fixed mount and support arm;
    said conical receptacle having a cone bearing surface which mates with a cone bearing surface of said cone plug to provide a rotary joint with a number of rotary positions;
    a biasing element pressing said cone plug and said cone receptacle together in a tight fit which minimizes play and wear between bearing surfaces of said cone plug and receptacle under loads;
    at least one detent corresponding to a rotary position of said moveable arm;
    a biased operator having a natural position, a first deflected position in which said biased operator is deflected away from said natural position, and a second deflected position in which said biased operator is deflected away from said first deflected position; and
    said biased operator including a cam for engaging a said one detent in said first deflected position to retain said arm in said one rotary position.

12. The assembly of claim 11 wherein said connector includes a fastener extending through said conical plug and base receptacle being attached to said support arm at one end and to said vehicle mount at a second end.

13. The assembly of claim 12 wherein said biasing element comprises a spring element carried about said fastener near one of said first and second ends of said pivot shaft urging said cone plug and receptacle together in a tight fit.

14. The apparatus of claim 11 wherein said operator comprising an elongated leaf spring having a first end and a second end with a cam being formed intermediate said first and second ends for engaging said one detent.

15. The assembly of claim 14 including mounting elements carried by said support arm for fixing said first and second ends of said elongated spring in said support arm with said cam facing said base.

16. The assembly of claim 14 including a first detent corresponding to an operating position of said mirror and a second detent corresponding to a non-operating position of said mirror, and said cam engaging said first and second detents to retain said mirror in said operation and non-operating positions, respectively.

17. A vehicle mirror assembly having at least one mirror head carried by a support arm positioned at a distance from the vehicle during normal operation; a vehicle mount for attachment to the vehicle; the support arm pivotally attached to said vehicle mount moveable between an operating position and a folded position; a rotary joint connected between said vehicle mount and said support arm about which said support arm pivots between one or more rotary positions, wherein said rotary joint comprises:
    a first rotary part carried by said vehicle mount;
    a second rotary part carried by said support arm;
    a fastener interconnecting said first and second rotary parts together in mating relationship so that said support arm and vehicle mount pivot relative to each other to said operating and folded positions;
    a detent carried by one of said vehicle mount and said support arm, said detent corresponding to said one operating position, respectively;
    an elongated spring element disposed between vehicle mount and said support arm, biased operator having a natural position, a first deflected position, and a second deflected position;
    said spring element having a cam formed near a medial portion of said spring element for engaging said one detent;
    said spring element deflecting to said first deflector position when said cam is engaged with said one detent, and said spring element deflecting to said second deflector position when said support arm is being moved from said first detent.

18. The apparatus of claim 17 said spring element is deflected away from said natural position in said first deflected position and is deflected away from said first deflected position in said second deflected position.

19. The apparatus of claim 17 wherein said elongated spring element has a first end and a second end carried by said one of said vehicle mount and support arm for fixing said elongated spring in an operating position facing toward one detent.

20. The assembly of claim 17 wherein said connector includes a fastener extending through said first and second rotary parts and attached to said support arm at one end and to said vehicle mount at a second end.

21. The assembly of claim 20 including a biasing element carried about said fastener near one of said first and second ends pressing said cone body and receptacle together in a tight fit.

22. The assembly of claim 21 wherein said biasing element comprises a Belleville washer carried about said fastener.

* * * * *